United States Patent
Bamba et al.

(10) Patent No.: US 10,392,482 B2
(45) Date of Patent: Aug. 27, 2019

(54) FIBER-REINFORCED RESIN MOLDING MATERIAL AND PRODUCTION METHOD THEREOF

(71) Applicant: Toray Industries, Inc., Tokyo (JP)

(72) Inventors: Kenta Bamba, Nagoya (JP); Tetsuya Motohashi, Nagoya (JP); Katsuhiro Miyoshi, Nagoya (JP); Takafumi Hashimoto, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 102 days.

(21) Appl. No.: 15/512,333

(22) PCT Filed: Aug. 31, 2015

(86) PCT No.: PCT/JP2015/074736
§ 371 (c)(1),
(2) Date: Mar. 17, 2017

(87) PCT Pub. No.: WO2016/043037
PCT Pub. Date: Mar. 24, 2016

(65) Prior Publication Data
US 2017/0260345 A1    Sep. 14, 2017

(30) Foreign Application Priority Data
Sep. 17, 2014   (JP) .................................. 2014-188635

(51) Int. Cl.
*C08J 5/04*   (2006.01)
*C08J 5/24*   (2006.01)

(52) U.S. Cl.
CPC ................. *C08J 5/042* (2013.01); *C08J 5/04* (2013.01); *C08J 5/24* (2013.01); *C08J 2335/02* (2013.01)

(58) Field of Classification Search
CPC ....... C08J 5/042; C08J 5/24; C08J 5/04; C08J 5/06; C08K 3/046; C08K 5/06
USPC ......................................................... 523/222
See application file for complete search history.

(56) References Cited

U.S. PATENT DOCUMENTS

| | | | | |
|---|---|---|---|---|
| 5,108,678 A | * | 4/1992 | Hirasaka | ................. B29C 70/12 156/296 |
| 2017/0305074 A1 | * | 10/2017 | Miyoshi | .................. B29C 70/12 |
| 2017/0355550 A1 | * | 12/2017 | Kawahara | ............ B65H 51/005 |
| 2018/0001580 A1 | * | 1/2018 | Miyoshi | ................ B29C 70/506 |
| 2018/0094368 A1 | * | 4/2018 | Bamba | ........................ C08J 5/06 |

FOREIGN PATENT DOCUMENTS

| | | |
|---|---|---|
| JP | 63-211351 A | 9/1988 |
| JP | 03-047740 A | 2/1991 |
| JP | 08-085111 A | 4/1996 |
| JP | 2008-174605 A | 7/2008 |
| JP | 2009-191116 A | 8/2009 |
| JP | 2010-163536 A | 7/2010 |
| JP | 2012-001606 A | 1/2012 |
| JP | 2013-049750 A | 3/2013 |
| JP | 2013-202890 A | 10/2013 |
| WO | 2013/035705 A1 | 3/2013 |
| WO | 2013/094702 A1 | 6/2013 |
| WO | 2014/021315 A1 | 2/2014 |

* cited by examiner

*Primary Examiner* — Hannah J Pak
(74) *Attorney, Agent, or Firm* — DLA Piper (US)

(57) ABSTRACT

A fiber-reinforced resin molding material includes at least bundled discontinuous reinforcing fiber aggregates and matrix resin, wherein said bundled reinforcing fiber aggregates include both reinforcing fiber aggregates (A) which are formed by cutting continuous reinforcing fiber strands after fiber splitting, in which said strands are completely split into multiple bundles, and reinforcing fiber aggregates (B) having at least unsplit strand sections in which fiber splitting is incomplete, an incision substantially originating from fiber splitting is present at least at one of both end portions of said reinforcing fiber aggregates (B), and a ratio of the weight of said reinforcing fiber aggregates (B) to the total weight of reinforcing fibers in said material is 5-50%.

12 Claims, 2 Drawing Sheets

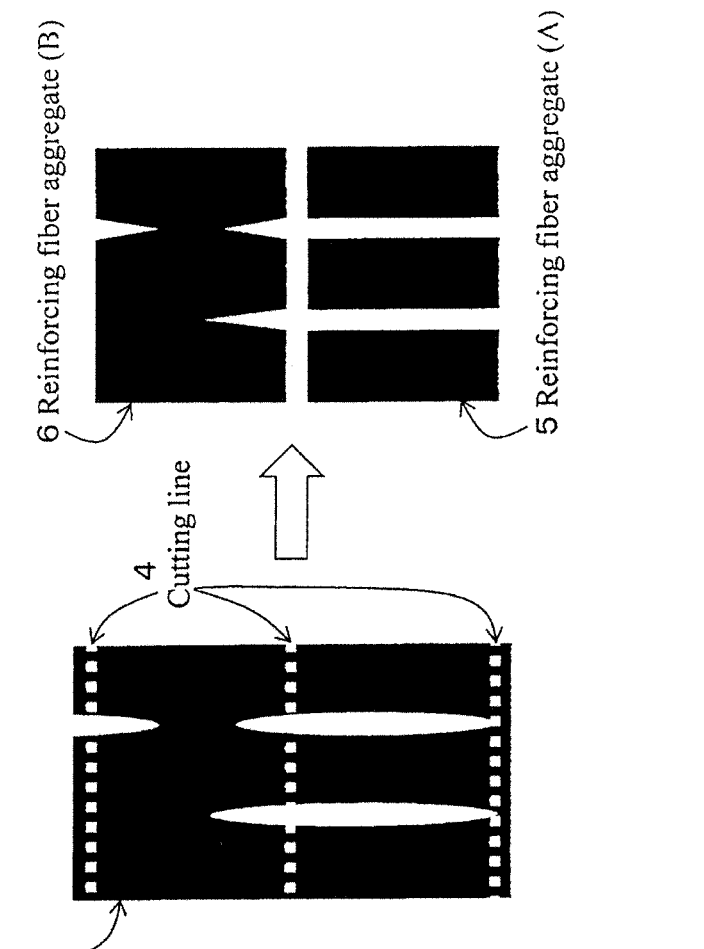
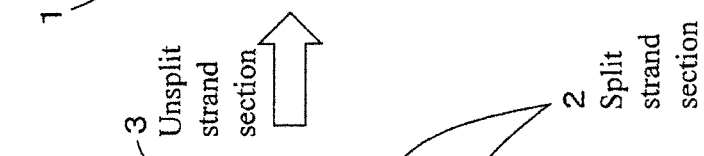
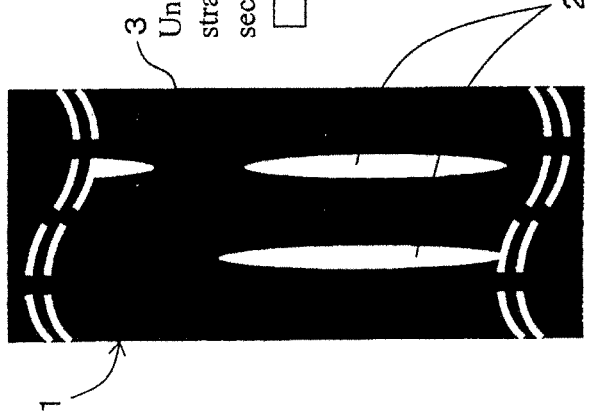

FIBER-REINFORCED RESIN MOLDING MATERIAL AND PRODUCTION METHOD THEREOF

TECHNICAL FIELD

This disclosure relates to a fiber-reinforced resin molding material and, specifically, to a fiber-reinforced resin molding material capable of achieving a good balance of both good flowability during molding using the molding material and excellent mechanical properties of a molded article after molding, and a production method thereof.

BACKGROUND

A technology is known wherein an molded article having a required shape is molded by heat, compression molding using a fiber-reinforced resin molding material comprising bundled aggregates (hereinafter, also referred to as fiber bundles) of discontinuous reinforcing fibers (for example, carbon fibers) and matrix resin (for example, a thermosetting resin) in, for example, JP-A-2013-202890, JP-A-2008-174605, JP-A-2009-191116, JP-A-2010-163536 and WO 2014/021315. In such a conventional fiber-reinforced resin molding material, when the fiber bundle in the fiber-reinforced resin molding material comprises a fiber bundle with a certain number of single fibers formed from a predetermined strand, in a molding material comprising fiber bundles with a large number of single fibers, although the flowability during molding is excellent, the mechanical properties of a molded article tend to be poor.

For example, JP '890 discloses a molding material in which the number of filaments of a chopped fiber bundle in the molding material is 10,000-700,000. In such a molding material, although a large number of filaments of the fiber bundle reinforcing fibers can efficiently move together with the resin as a fiber bundle at the time of molding and, therefore, an excellent flowability can be obtained, with respect to a molded article due to this molding material after molding, there is a high possibility to cause stress concentration at the end portion of the fiber bundle or the like in the molded article when the molded article is broken, and it is not suitable for molding a molded article required with high mechanical properties.

On the other hand, for example, in JP '605, although a fiber-reinforced resin is disclosed which uses fiber bundles dispersed so that the number of single fibers becomes 100 or less because the number of single fibers is small compared to the formation disclosed in JP '890, the reinforcing fibers well disperse in the molded article, the possibility to cause stress concentration at the end portion of the fiber bundle or the like in the molded article becomes low and the mechanical properties of the molded article can be enhanced and, on the contrary, there remains a possibility that a high flowability at the time of molding as expected cannot be obtained.

As described above, in a fiber-reinforced resin molding material using fiber bundles with a relatively large number of single fibers, although production efficiency is good and excellent flowability at the time of molding tends to be obtained, the mechanical properties of a molded article tend to be poor and, in a fiber-reinforced resin molding material using fiber bundles with a relatively small number of single fibers, on the contrary, although the mechanical properties of a molded article are excellent, flowability at the time of molding tends to be difficult to be enhanced.

Accordingly, paying attention to the tendencies in the above-described conventional technologies, it could be helpful to provide a fiber-reinforced resin molding material capable of achieving at a good balance both good flowability during molding and excellent mechanical properties of a molded article, and a production method thereof.

SUMMARY

We thus provide:

A fiber-reinforced resin molding material comprises at least bundled discontinuous reinforcing fiber aggregates and matrix resin, and is characterized in that the bundled reinforcing fiber aggregates comprise both reinforcing fiber aggregates (A) which are formed by cutting continuous reinforcing fiber strands after fiber splitting, in which the strands are completely split into multiple bundles, and reinforcing fiber aggregates (B) having at least unsplit strand sections in which fiber splitting is incomplete, an incision substantially originating from fiber splitting is present at least at one of both end portions of the reinforcing fiber aggregates (B), and a ratio of the weight of the reinforcing fiber aggregates (B) to the total weight of reinforcing fibers in the material is in a range of 5-50%.

In such a fiber-reinforced resin molding material, contained are both reinforcing fiber aggregates (A) which are formed by cutting continuous reinforcing fiber strands after fiber splitting, in which the strands are completely split into multiple bundles, (namely, reinforcing fiber aggregates (A) with a relatively small number of single fibers formed by fiber splitting), and reinforcing fiber aggregates (B) having at least unsplit strand sections in which fiber splitting is incomplete, and having an incision substantially originating from fiber splitting at least at one of both end portions thereof, (namely, reinforcing fiber aggregates (B) with a relatively large number of single fibers), and a ratio of the weight of the reinforcing fiber aggregates (B) to the total weight of reinforcing fibers is controlled in a specified range of 5-50%. The reinforcing fiber aggregates (A) with a small number of single fibers can contribute to improve the mechanical properties of a molded article after molding, the reinforcing fiber aggregates (B) with a large number of single fibers can contribute to improve the flowability during molding, and by controlling the weight ratio of the reinforcing fiber aggregates (B) within the specified range, both these flowability and mechanical properties can be controlled as properties within target ranges.

It is preferred that an average fiber length of the reinforcing fiber aggregates (A) and the reinforcing fiber aggregates (B) is in a range of 5-100 mm. If the average fiber length is less than 5 mm, there is a possibility that the reinforcing effect of a molded article by the reinforcing fibers becomes insufficient, and if the average fiber length is more than 100 mm, there is a fear that good flowability during molding becomes difficult, thereby causing a possibility of reduction of the flowability or bending of the reinforcing fibers.

Further, it is preferred that the number of single fibers of the respective reinforcing fiber aggregates (A) is in a range of 800-10,000. If the number of single fibers of the reinforcing fiber aggregates (A) is less than 800, although high mechanical properties of a molded article are liable to be obtained, there is a possibility that reduction of the flowability during molding becomes great. If it is more than 10,000, although improvement of the flowability can be expected, stress concentration is liable to be caused in a molded article and there is a possibility that sufficiently high mechanical properties cannot be expected, and at the same time, the difference between the reinforcing fiber aggregates (A) formed through fiber splitting and the reinforcing fiber aggregates (B) becomes unclear, and there is a possibility that the basic concept intending to intermingle these reinforcing fiber aggregates (A) and (B) may be injured.

Further, the kind of used reinforcing fibers is not particularly restricted, it is possible to use arbitrary reinforcing fibers such as carbon fibers, glass fibers, aramide fibers, a combination thereof or the like, but in case where the reinforcing fibers comprise carbon fibers, the effect is particularly remarkable.

As the matrix resin in the fiber-reinforced resin molding material, a thermosetting resin and a thermoplastic resin can be both used.

The above-described fiber-reinforced resin molding material can be produced, for example, by the following method. Namely, a method of producing a fiber-reinforced resin molding material comprising at least bundled discontinuous reinforcing fiber aggregates and matrix resin, is characterized in that as the bundled reinforcing fiber aggregates, both reinforcing fiber aggregates (A) which are formed by cutting continuous reinforcing fiber strands after fiber splitting, in which the strands are completely split into multiple bundles, and reinforcing fiber aggregates (B) having at least unsplit strand sections in which fiber splitting is incomplete, and having an incision substantially originating from fiber splitting at least at one of both end portions thereof, are used, and an amount of used reinforcing fiber aggregates (B) is controlled so that a ratio of the weight of the reinforcing fiber aggregates (B) to the total weight of reinforcing fibers in the material becomes within a range of 5-50%.

Thus, in the fiber-reinforced resin molding material and the production method thereof, it becomes possible to achieve at a good balance both good flowability during molding and excellent mechanical properties of a molded article. In addition, because a large tow with a large number of single fibers can be used as the continuous reinforcing fiber strand for making the reinforcing fiber aggregates (A) and (B), it becomes possible to improve the productivity and reduce the manufacturing cost.

BRIEF DESCRIPTION OF THE DRAWINGS

FIGS. 1(A)-1(C) are schematic plan views showing an example of forming reinforcing fiber aggregates (A) and reinforcing fiber aggregates (B).

EXPLANATION OF SYMBOLS

Figure 2:
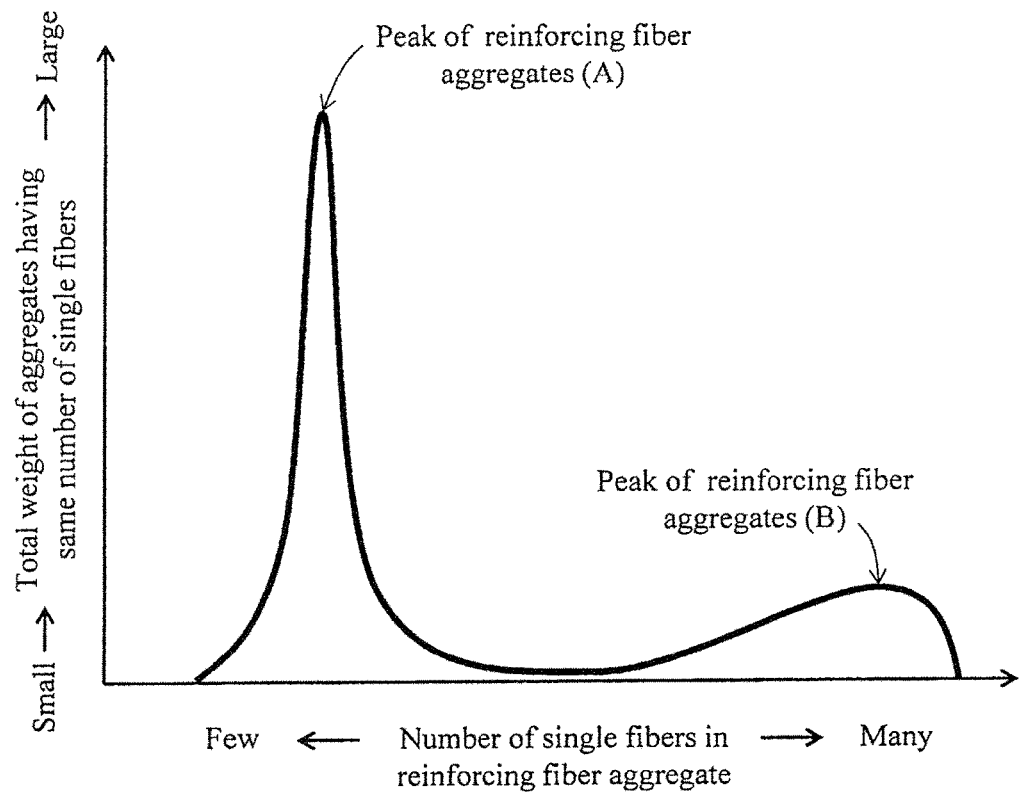
FIG. 2 is a graph showing an example of a distribution of reinforcing fiber aggregates in a fiber-reinforced resin molding material.

1: strand of continuous reinforcing fibers
2: split strand section
3: unsplit strand section
4: cutting line
5: reinforcing fiber aggregates (A)
6: reinforcing fiber aggregates (B)

DETAILED DESCRIPTION

Hereinafter, our materials and methods will be explained in detail together with examples for carrying out it.

We provide a fiber-reinforced resin molding material comprising at least bundled discontinuous reinforcing fiber aggregates and matrix resin, characterized in that the bundled reinforcing fiber aggregates comprise both reinforcing fiber aggregates (A) formed by cutting continuous reinforcing fiber strands after fiber splitting, in which the strands are completely split into multiple bundles, and reinforcing fiber aggregates (B) having at least unsplit strand sections in which fiber splitting is incomplete, and having an incision substantially originating from fiber splitting at least at one of both end portions thereof, and a ratio of the weight of the reinforcing fiber aggregates (B) to the total weight of reinforcing fibers in the material is 5-50%. Such a fiber-reinforced resin molding material can be produced, for example, by using both the reinforcing fiber aggregates (A) and the reinforcing fiber aggregates (B) and controlling the amount of reinforcing fiber aggregates (B) so that a ratio of the weight of the reinforcing fiber aggregates (B) to the total weight of reinforcing fibers in the material is 5-50%.

The above-described reinforcing fiber aggregates (A) and reinforcing fiber aggregates (B) are formed, for example, as shown in FIG. 1. The vertical direction of the paper surface of FIG. 1 shows a direction in which continuous fibers of a strand extend. In the example, as shown in FIG. 1(A), in the longitudinal direction of a strand 1 of continuous reinforcing fibers, split strand sections 2 performed with splitting in which the strand 1 is completely split into multiple bundles as viewed along the width direction of the strand 1, and unsplit strand sections 3 in which fiber splitting has not been performed and/or fiber splitting is incomplete, are formed. After splitting is performed, the strand 1 is cut at positions of cutting lines 4 as shown in FIG. 1(B) and, whereby, as shown in FIG. 1(C), reinforcing fiber aggregates (A) 5 formed by cutting after fiber splitting, and reinforcing fiber aggregates (B) 6 having unsplit strand sections in which fiber splitting has not been performed and/or fiber splitting is incomplete, are formed.

Both many reinforcing fiber aggregates (A) and reinforcing fiber aggregates (B) formed in the above-described manner are used, the amount of used reinforcing fiber aggregates (B) is controlled so that the ratio of the weight of the reinforcing fiber aggregates (B) to the total weight of reinforcing fibers in the material is 5-50%, and the reinforcing fiber aggregates are served to molding of a fiber-reinforced resin molding material together with a matrix resin.

When an example of the distribution of the above-described reinforcing fiber aggregates in the fiber-reinforced resin molding material served to the molding is shown, for example, it becomes as shown in FIG. 2. FIG. 2 shows a graph in which the lateral axis is referred to as a number of single fibers in the reinforcing fiber aggregates and the vertical axis is referred to as a total weight of the reinforcing fiber aggregates having a same number of single fibers. The example shown in FIG. 2 is an example in which reinforcing fiber aggregates (A) having a relatively small number of single fibers and reinforcing fiber aggregates (B) having a relatively large number of single fibers have peaks with respect to weight on the lateral axis, respectively. The integral of the area under the curved line shown in this graph is considered to correspond to the total weight of reinforcing fibers in the material, and it is considered that an integral of an area under the curved line in a region of a certain number of single fibers or more corresponds to a weight of reinforcing fiber aggregates (B). The amount of reinforcing fiber aggregates (B) is controlled so that the ratio of the above-described weight of the reinforcing fiber aggregates (B) to the total weight of reinforcing fibers in the material is 5-50%.

In the fiber-reinforced resin molding material, the kind of reinforcing fibers is not particularly restricted, it is possible to use arbitrary reinforcing fibers such as carbon fibers, glass fibers, aramide fibers, or a combination thereof and, when the reinforcing fibers comprise carbon fibers, the disclosed effect is particularly great. Further, in carbon fibers, the average fiber diameter is preferably 3-12 μm, and more preferably 5-9 μm.

As the method of sizing treatment of reinforcing fibers, a method is preferred for, after dipping carbon fibers in a solution prepared by dispersing resin in water or a solvent, drying them. Although the kind of resin used as the sizing agent is not particularly restricted, it preferably has a compatibility with a matrix resin, and it is preferred that it is a same kind of resin as the matrix resin.

As the matrix resin in the fiber-reinforced resin molding material, a thermosetting resin and a thermoplastic resin can be both used, the thermosetting resin material used for a carbon fiber composite material is not particularly restricted, and it can be appropriately selected within a range that does not greatly reduce the mechanical properties as a molded article. For example, a vinyl ester resin, an epoxy resin, an unsaturated polyester resin, a phenolic resin, an epoxy acrylate resin, a urethane acrylate resin, a phenoxy resin, an alkyd resin, a maleimide resin, a cyanate resin or the like can be used. In particular, any of a vinyl ester resin, an epoxy resin, an unsaturated polyester resin and a phenolic resin, or a mixture thereof is preferred.

The kind of the thermoplastic resin material also is not particularly restricted, and it can be appropriately selected within a range that does not greatly reduce the mechanical properties as a molded article. For example, a polyolefin-based resin such as a polyethylene resin or a polypropylene resin, a polyamide-based resin such as a nylon 6 resin or a nylon 6, 6 resin, a polyester-based resin such as a polyethylene terephthalate resin or a polybutylene terephthalate resin, or a resin such as a polyphenylene sulfide resin, a polyether ketone resin, a polyether sulfone resin or an aromatic polyamide resin, can be used. In particular, any of a polyamide resin, a polypropylene resin and a polyphenylene sulfide resin is preferred.

The continuous fibers that have been split means that the continuous reinforcing fibers have sections split into a plurality of fiber bundles. For example, the continuous fibers that have been split can be obtained by blowing air periodically and locally from a direction perpendicular to the fiber longitudinal direction of the continuous reinforcing fibers, but the method of splitting is not limited thereto.

The continuous reinforcing fiber strand that has been split is served to the cutting step for cutting it at a predetermined length as shown in aforementioned FIG. 1(B). The cutting method in this cutting step also is not particularly restricted and, for example, a method of cutting the strand intermittently at a predetermined pitch in the longitudinal direction using a mechanical cutter can be employed.

As shown in FIG. 1(C), the reinforcing fiber aggregates (A) formed by cutting after fiber splitting, and the reinforcing fiber aggregates (B) having at least unsplit strand sections in which fiber splitting is incomplete, and having an incision substantially originating from fiber splitting at least at one of both end portions thereof, formed as shown in FIG. 1(C), are scattered, for example, to form a non-woven fabric of reinforcing fiber aggregates. In the non-woven fabric formed in such a scattering process, as aforementioned, the ratio of the weight of the reinforcing fiber aggregates (B) to the total weight of reinforcing fibers is controlled to 5-50%. Although the control within this range is also possible by obtaining the reinforcing fiber aggregates (A) and the reinforcing fiber aggregates (B) separately from each other and mixing them at a predetermined ratio, in the conditions of the splitting and the conditions of the cutting performed thereafter, for example, in consideration of the ratio of the area of the split strand sections to the total plan area of the continuous reinforcing fiber strand and the cutting length, the ratio of the weight of the reinforcing fiber aggregates (B) to the total weight of reinforcing fibers can be almost precisely guessed. If the conditions of the splitting and cutting are set so that this weight ratio becomes within the above-described predetermined range, it is possible to obtain a desired non-woven fabric only by scattering the whole of the reinforcing fiber aggregates obtained after the cutting merely as they are.

In the fiber-reinforced resin molding material, the content by weight of the reinforcing fibers relative to the total weight of the fiber-reinforced resin molding material is preferably 30-60%, and more preferably 35-50%.

It is desired that the fiber length of the reinforcing fiber aggregates is determined at an accuracy of a unit of 1 mm or less using a microscope or callipers and the like. Further, when the respective fiber lengths of single fibers in the reinforcing fiber aggregates are not uniform, the fiber length is geometrically calculated. For example, when in the cutting step there exist reinforcing fiber aggregates cut obliquely relative to the fiber extending direction, an average value of the longest fiber length and the shortest fiber length in the reinforcing fiber aggregates can be deemed to be the fiber length of the reinforcing fiber aggregates. Further, the average fiber length of the reinforcing fiber aggregates is preferably 5-100 mm, and more preferably 10-80 mm. Furthermore, the distribution of fiber lengths may be a single fiber length distribution, and may be a mixture of two or more kinds.

The weight of the reinforcing fiber aggregates can be determined by measuring the weights of the respective reinforcing fiber aggregates from the sample obtained and summing them, and it is preferred that the weight is determined at an accuracy of $1/100$ mg or less.

The number of single fibers in the reinforcing fiber aggregate can be calculated by equation (1):

Number of single fibers in reinforcing fiber aggregate (number)=weight of aggregate (g)×fiber length (m)/fineness (g/m)     (1).

Although the reinforcing fiber aggregates (A) in the fiber-reinforced resin molding material may contain aggregates, further divided with the aggregates (A), at a small content in the cutting process, the scattering process and the resin impregnation process after the splitting process, it is preferred that the respective reinforcing fiber aggregates (A) are 800-10,000 in number of single fibers. Moreover, it is preferred that, when a range α, in which a difference between upper and lower limit numbers arbitrarily set in the above-described range is 1,000 or less is set, the number of the above-described aggregates (A) and the total weight of the aggregates become largest in the range of 800-10,000 in number of single fibers.

Although the reinforcing fiber aggregates (B) in the fiber-reinforced resin molding material may contain aggregates, further divided with the aggregates (B), at a small content in the cutting process, the scattering process and the resin impregnation process after the splitting process, it is preferred that the reinforcing fiber aggregates having a greater number of single fibers than those of the reinforcing fiber aggregates (A) having a number of single fibers in the predetermined range in the fiber-reinforced resin molding material are all deemed to be reinforcing fiber aggregates (B).

The ratio (%) of the weight of the reinforcing fiber aggregates (B) to the total weight of reinforcing fibers in the fiber-reinforced resin molding material is calculated by equation (2):

Weight ratio=weight of reinforcing fiber aggregates (B)/weight of all reinforcing fibers in fiber-reinforced resin molding material×100    (2).

EXAMPLES

Hereinafter, Examples will be explained, but this disclosure is not limited thereto.

In particular, as long as there is not an annotation with respect to a fiber-reinforced resin molding material and a sample thereof, the unit of the length of a fiber bundle (fiber length) is mm, and the unit of a weight is g. The carbon fibers and the thermosetting resin used in Examples and Comparative Examples are as follows:

- Carbon fibers: carbon fibers supplied by Zoltek Corporation "Panex (registered trade mark) R 35 Tow" (fiber diameter: 7.2 μm, strand: 50K (K represents a number of 1,000), tensile strength: 4,137 MPa)
- Matrix resin: vinyl ester resin (supplied by The Dow Chemical Company, "DRAKEN" (registered trade mark))
- Curing agent: tert-butyl peroxybenzoate (supplied by Nippon Oil & Fats Co., Ltd., "Perbutyl (registered trade mark) Z"
- Thickener: magnesium oxide (supplied by Kyowa Chemical Industry Co., Ltd., MgO#40).

Determination of Weight Ratio of Fiber-reinforced Resin Molding Material

First, a sample of 100 mm×100 mm was cut out from a fiber-reinforced resin molding material, and the sample heated in a furnace at a condition of 600° C.×1 hour to remove resin. Then, by measuring the weight of the sample removed with resin, the weight of all carbon fibers in the fiber-reinforced resin molding material was determined. Further, all reinforcing fiber aggregates were taken out from the sample using a pair of tweezers, and the weights of the respective reinforcing fiber aggregates determined. In the determination of the weights, a balance capable of determining up to a scale of 1/100 mg was used. Then, in the respective reinforcing fiber aggregates taken out using a pair of tweezers, the fiber lengths were determined up to a unit of 1/100 mg using a Vernier caliper. The number of single fibers in each reinforcing fiber aggregate was calculated by equation (1a):

Number of single fibers in reinforcing fiber aggregate (number)=weight of aggregate (g)×fiber length (m)/fineness (g/m)    (1a).

In the reinforcing fiber aggregates in the fiber-reinforced resin molding material, reinforcing fiber aggregates controlled to have an arbitrary number of single fibers in a certain range were referred to be reinforcing fiber aggregates (A), and the total weight of the aggregates (A) was determined. Further, reinforcing fiber aggregates having a number of single fibers more than those of reinforcing fiber aggregates (A) were referred to be reinforcing fiber aggregates (B), and the total weight of the aggregates (B) was determined. The ratio (%) of the weight of the reinforcing fiber aggregates (B) to the total weight of carbon fibers in the fiber-reinforced resin molding material was calculated by equation (2a):

Weight ratio=weight of reinforcing fiber aggregates (B)/weight of all carbon fibers in fiber-reinforced resin molding material×100    (2a).

Evaluation of Mechanical Properties

A mold No. 1 capable of making a flat plate was used. After a fiber-reinforced resin molding material was placed in a central portion of the mold No. 1 (about 50% as a charge rate), under a pressurized condition of 10 MPa by a pressurizing type press machine, it was cured at a condition of about 130° C.×6 minutes to obtain a flat plate of 300×400 mm. In the 0 degree direction (longitudinal direction of the flat plate: 0 degree) and 90 degree direction, respectively, 5 test pieces (totally 10 pieces) each having a size of 100× 25×1.6 mm were cut out from the flat plate, and the determination was carried out based on JIS K7074(1988).

Evaluation of Flowability

A mold No. 2 having convexo-concave portions and grooves to form ribs was used. After a fiber-reinforced resin molding material was placed in a central portion of the mold No. 2 (about 50% as a charge rate) under a pressurized condition of 10 MPa by a pressurizing type press machine, it was cured at a condition of about 130° C.×6 minutes to obtain a molded article. By visual observation of the molded article with respect to the evaluation items shown in the following Table 1, comprehensive evaluation of flowability as to each molded article was carried out.

TABLE 1

| Determination | Quality |
|---|---|
| A | Underfill none, and beautiful surface appearance |
| B | Underfill none, and fine wrinkles are present at a part. |
| C | Underfill none, and clearly visual wrinkles are present at a part although unevenness is not present. |
| D | Although underfill is not present, resin staying portions, or wrinkles or protrusions having unevenness are present. |
| E | Underfill parts are present. |

※ In this disclosure, determinations A, B and C are judged to be no problem as a molded article.

Example 1

As carbon fibers, the aforementioned "Panex (registered trade mark) R 35 Tow" was used. By cutting continuous carbon fiber strands carried out with splitting by periodically and locally blowing air at a predetermined condition from a direction perpendicular to the fiber longitudinal direction of the continuous carbon fibers, and scattering cut strands to be uniformly distributed, a discontinuous carbon fiber nonwoven fabric having an isotropic fiber orientation was obtained. A rotary cutter was used as the cutting device. The interval of blades was set at 30 mm. Further, the areal weight of the discontinuous carbon fiber non-woven fabric was 1 kg/m².

By impregnating a resin compounded with a matrix resin of 100 parts by weight and a thickener of 7 parts by weight to the discontinuous carbon fiber non-woven fabric with a roller, a sheet-like fiber-reinforced resin molding material was obtained. The weight content of carbon fibers of the fiber-reinforced resin molding material was 40%, and the density 1.46 g/cm³. Further, the determination result of weight ratio of reinforcing fiber aggregates (B) was 25%. When test pieces were cut out from a flat plate prepared by molding the fiber-reinforced resin molding material by the mold No. 1 and the determination was carried out based on JIS K7074(1988), the flexural strength was 374 MPa. Further, in a molded article prepared by molding the fiber-reinforced resin molding material by the mold No. 2, although underfill and protrusions were not observed, fine wrinkles were generated at a part of the surface (Determination B).

Example 2

It was carried out similarly to Example 1 other than a condition where the splitting condition was adjusted and the weight ratio of reinforcing fiber aggregates (B) was controlled at 5%.

Example 3

It was carried out similarly to Example 1 other than a condition where the splitting condition was adjusted and the weight ratio of reinforcing fiber aggregates (B) was controlled at 50%.

Example 4

It was carried out similarly to Example 1 other than a condition where the interval of blades of the rotary cutter was adjusted and the average fiber length of reinforcing fiber aggregates (A) and reinforcing fiber aggregates (B) controlled at 5 mm.

Example 5

It was carried out similarly to Example 1 other than a condition where the interval of blades of the rotary cutter was adjusted and the average fiber length of reinforcing fiber aggregates (A) and reinforcing fiber aggregates (B) controlled at 100 mm.

Example 6

It was carried out similarly to Example 1 other than a condition where the splitting condition was adjusted and the number of single fibers of reinforcing fiber aggregates (A) in the range a controlled at 1,000.

Example 7

It was carried out similarly to Example 1 other than a condition where the splitting condition was adjusted and the number of single fibers of reinforcing fiber aggregates (A) in the range a controlled at 10,000. The results in Examples 1-7 are shown in Table 2.

Comparative Example 1

It was carried out similarly to Example 1 other than a condition where the weight ratio of reinforcing fiber aggregates (B) was controlled at 100%.

Comparative Example 2

It was carried out similarly to Example 1 other than a condition where the weight ratio of reinforcing fiber aggregates (B) was controlled at 0%. The results in Comparative Examples 1 and 2 are shown in Table 3.

TABLE 2

| | | Example | | | | | | |
|---|---|---|---|---|---|---|---|---|
| | Unit | 1 | 2 | 3 | 4 | 5 | 6 | 7 |
| Number of single fibers of reinforcing fiber aggregates (A) in range α | Number | 2,000 | 2,000 | 2,000 | 2,000 | 2,000 | 1,000 | 10,000 |
| Weight ratio of reinforcing fiber aggregates (B) | % | 25 | 5 | 50 | 25 | 25 | 25 | 25 |
| Average fiber length of reinforcing fiber aggregates (A) and (B) | mm | 30 | 30 | 30 | 5 | 100 | 30 | 30 |
| Evaluation Flexural strength | MPa | 374 | 417 | 348 | 353 | 436 | 409 | 311 |
| Flowability | — | B | C | A | A | C | B | A |

TABLE 3

|  | Unit | Comparative Example 1 | Comparative Example 2 |
|---|---|---|---|
| Number of single fibers of reinforcing fiber aggregates (A) in range α | Number | — | 2,000 |
| Weight ratio of reinforcing fiber aggregates (B) | % | 100 | 0 |
| Average fiber length of reinforcing fiber aggregates (A) and (B) | mm | 30 | 30 |
| Evaluation Flexural strength | MPa | 191 | 421 |
| Flowability | — | A | E |

As shown in Tables 2 and 3, in Examples 1-7, in particular, the weight ratios of reinforcing fiber aggregates (B) were in our range of 5-50%, and good flowability during molding and excellent mechanical properties (in particular, flexural strength) of a molded article were both satisfied in a good balance. On the other hand, in Comparative Example 1, because the weight ratio of reinforcing fiber aggregates (B) was 100%, although the flowability during molding was good, the mechanical properties of the molded article were poor. In Comparative Example 2, because the weight ratio of reinforcing fiber aggregates (B) was 0%, although excellent mechanical properties of the molded article could be achieved, flowability during molding was not good, and underfill parts were present in the molded article Determination E) and, therefore, in both Comparative Examples 1 and 2, good flowability during molding and excellent mechanical properties of a molded article were not both satisfied in a good balance.

INDUSTRIAL APPLICABILITY

Our materials and methods can be applied to any fiber-reinforced resin molding material desired with satisfaction of both good flowability during molding and excellent mechanical properties of a molded article at a good balance.

The invention claimed is:

1. A fiber-reinforced resin molding material comprising at least bundled aggregates of discontinuous reinforcing fibers and matrix resin, wherein said bundled aggregates of reinforcing fibers comprise both reinforcing fiber aggregates (A) which are formed by cutting continuous reinforcing fiber strands after fiber splitting, in which said strands are completely split into multiple bundles, and reinforcing fiber aggregates (B) having at least unsplit strand sections in which fiber splitting is incomplete, an incision originating from fiber splitting is present at least at one of both end portions of said reinforcing fiber aggregates (B), and a ratio of the weight of said reinforcing fiber aggregates (B) to the total weight of reinforcing fibers in said material is 5-50%.

2. The fiber-reinforced resin molding material according to claim 1, wherein an average fiber length of said reinforcing fiber aggregates (A) and said reinforcing fiber aggregates (B) is 5-100 mm.

3. The fiber-reinforced resin molding material according to claim 1, wherein a number of single fibers of said reinforcing fiber aggregates (A) is 800-10,000.

4. The fiber-reinforced resin molding material according to claim 1, wherein said reinforcing fibers comprise carbon fibers.

5. The fiber-reinforced resin molding material according to claim 1, wherein said matrix resin comprises a thermosetting resin or a thermoplastic resin.

6. A method of producing a fiber-reinforced resin molding material comprising at least bundled aggregates of discontinuous reinforcing fibers and matrix resin, wherein, as said bundled aggregates of reinforcing fibers, both reinforcing fiber aggregates (A) which are formed by cutting continuous reinforcing fiber strands after fiber splitting, in which said strands are completely split into multiple bundles, and reinforcing fiber aggregates (B) having at least unsplit strand sections in which fiber splitting is incomplete, are used, and an amount of used reinforcing fiber aggregates (B) is controlled so that a ratio of the weight of said reinforcing fiber aggregates (B) to the total weight of reinforcing fibers in said material is 5-50%.

7. The fiber-reinforced resin molding material according to claim 2, wherein a number of single fibers of said reinforcing fiber aggregates (A) is 800-10,000.

8. The fiber-reinforced resin molding material according to claim 2, wherein said reinforcing fibers comprise carbon fibers.

9. The fiber-reinforced resin molding material according to claim 3, wherein said reinforcing fibers comprise carbon fibers.

10. The fiber-reinforced resin molding material according to claim 2, wherein said matrix resin comprises a thermosetting resin or a thermoplastic resin.

11. The fiber-reinforced resin molding material according to claim 3, wherein said matrix resin comprises a thermosetting resin or a thermoplastic resin.

12. The fiber-reinforced resin molding material according to claim 4, wherein said matrix resin comprises a thermosetting resin or a thermoplastic resin.

* * * * *